UNITED STATES PATENT OFFICE.

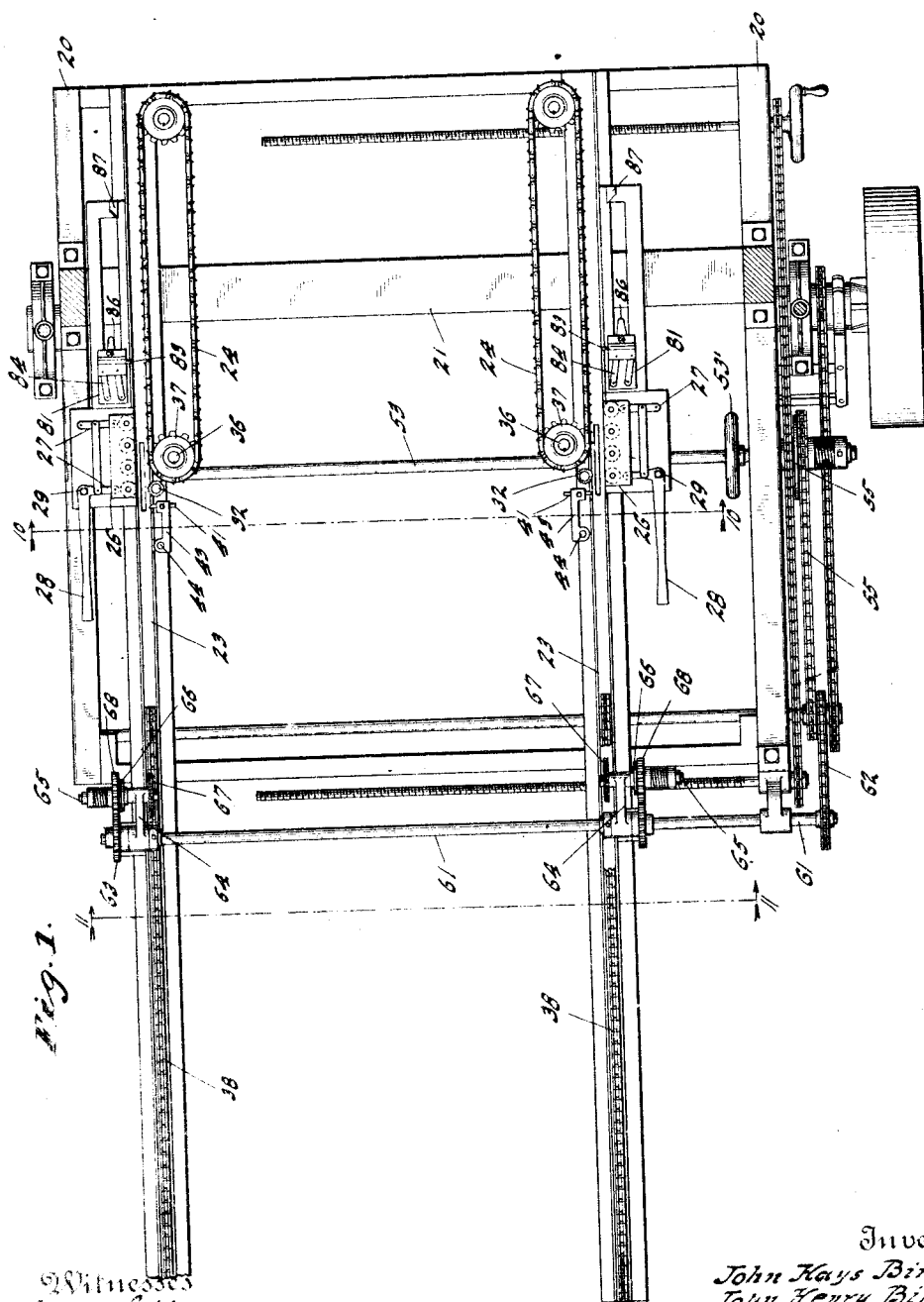

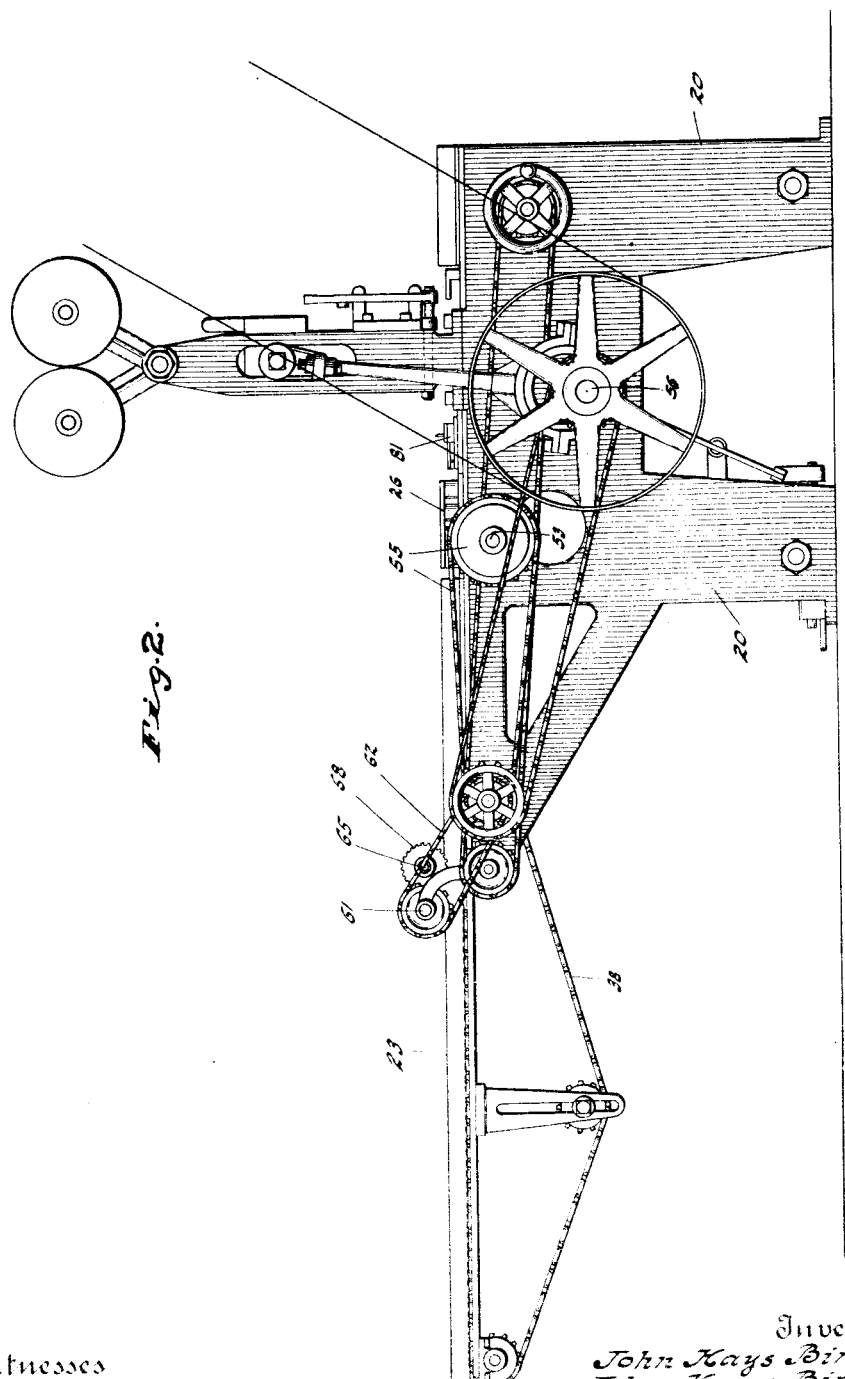

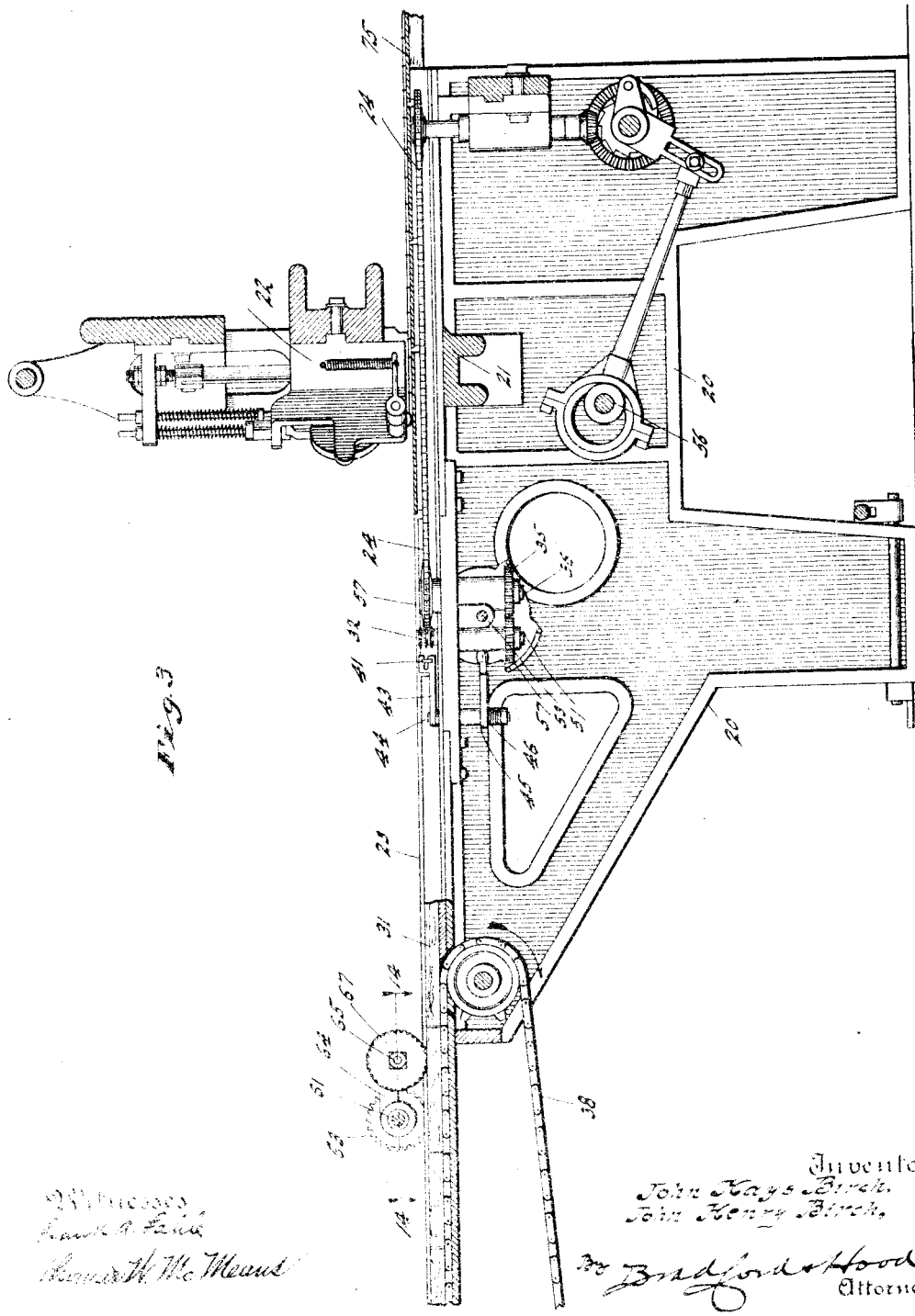

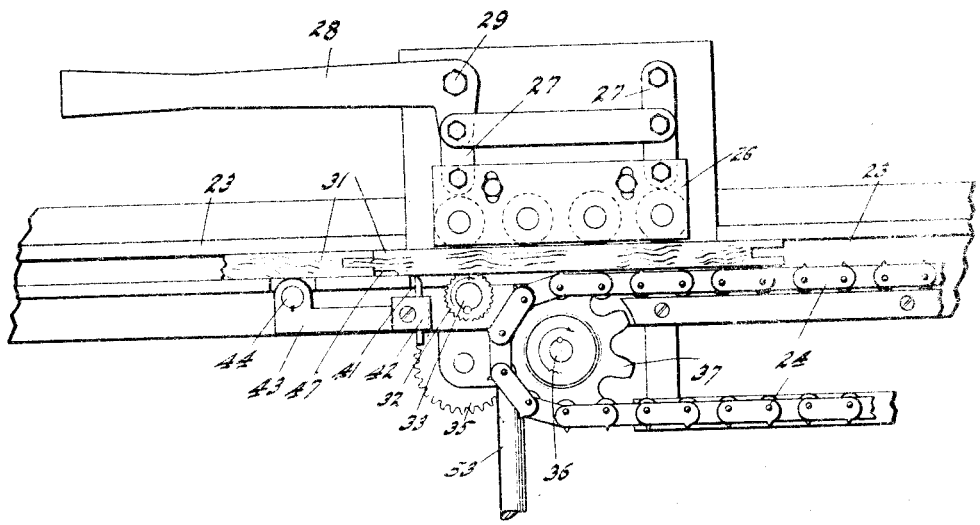

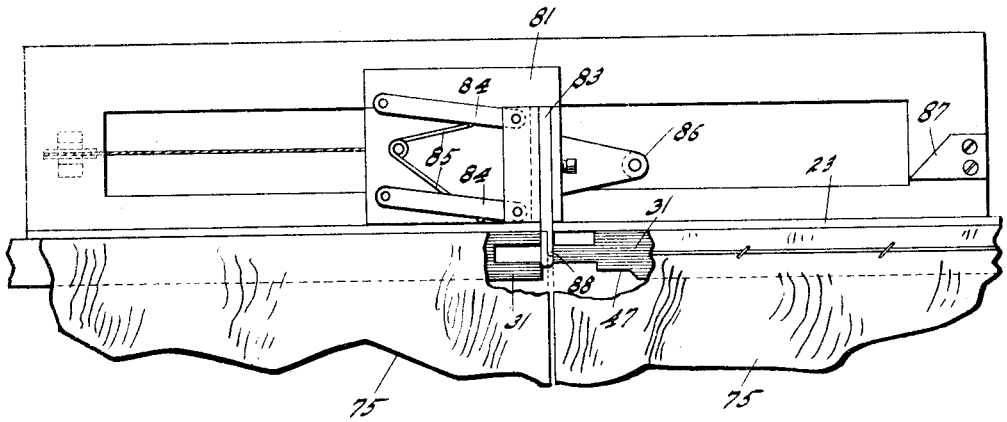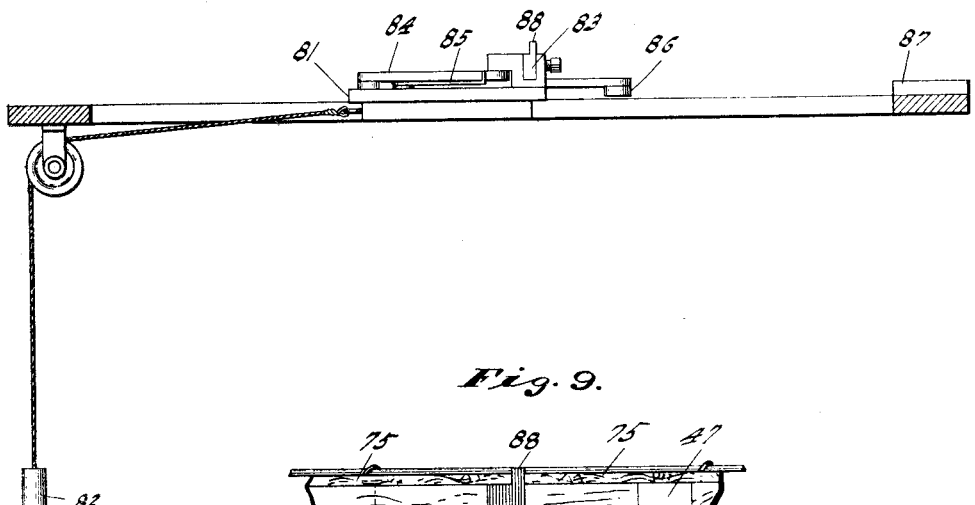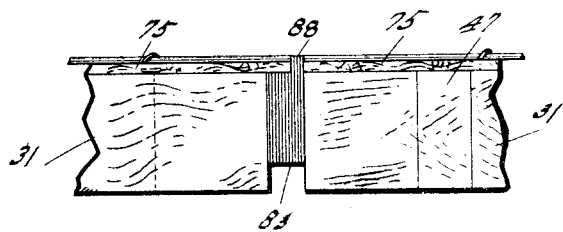

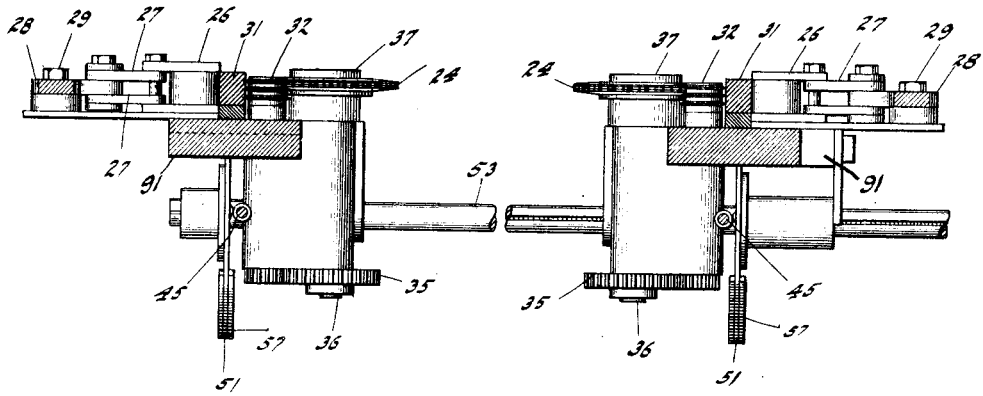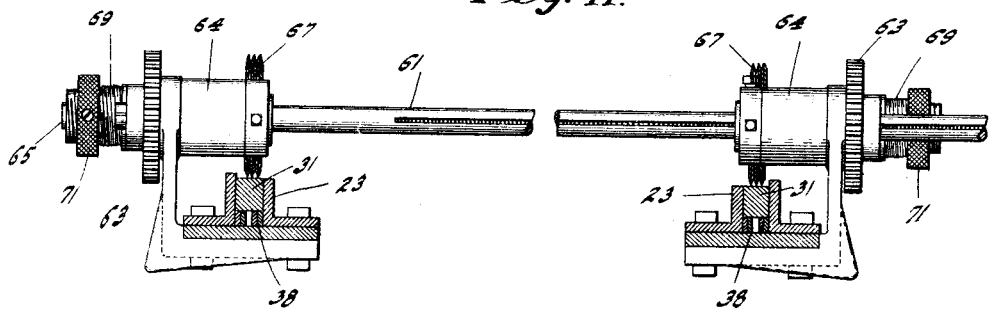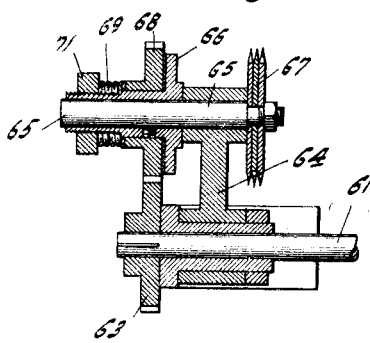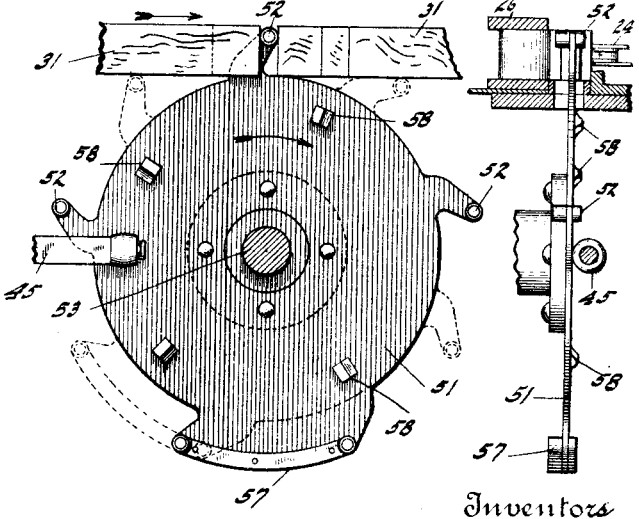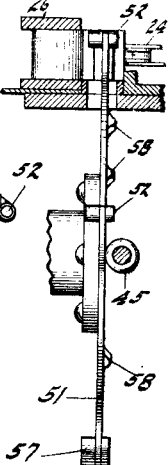

JOHN HAYS BIRCH AND JOHN HENRY BIRCH, OF CRAWFORDSVILLE, INDIANA, ASSIGNORS TO GREENSTREET FOLDING BOX MACHINE COMPANY, OF CRAWFORDSVILLE, INDIANA, A CORPORATION OF ARIZONA.

WIRE-BOUND-BOX MACHINE.

1,107,192.     Specification of Letters Patent.     Patented Aug. 11, 1914.

Application filed June 20, 1910. Serial No. 568,037.

*To all whom it may concern:*

Be it known that we, JOHN HAYS BIRCH and JOHN HENRY BIRCH, citizens of the United States, residing at Crawfordsville, in the county of Montgomery and State of Indiana, have invented a new and useful Wire-Bound-Box Machine, of which the following is a specification.

The object of our invention is to produce an improved machine for the continuous production of wire-bound box blanks, without the use of loose spacer blocks.

The accompanying drawings illustrate our invention.

Figure 1 is a plan of a machine embodying our invention; Fig. 2 a side elevation; Fig. 3 a longitudinal section on a larger scale; Fig. 4 a plan of the cleat-feeding and spacing mechanism; Fig. 5 an elevation of parts shown in Fig. 4; Fig. 6 a horizontal sectional detail of the spacer wheel and the gearing for driving the said wheel which lies between the interrupter and the spaced-cleat feeder chain; Fig. 7 a plan of the sheet gage and adjacent parts; Fig. 8 an elevation of the sheet gage; Fig. 9 a fragmentary elevation of adjacent cleats and the inserted sheet gage; Fig. 10 a section on line 10—10 of Fig. 1, on an enlarged scale; Fig. 11 a section on line 11—11 of Fig. 1, Figs. 12 and 13 details of the manner of association of the rotary spacer with the cleats, and Fig. 14 an enlarged section on line 14—14 of Fig. 3.

In the drawings, 20 indicates a suitable supporting frame provided with a stapling anvil 21 and stapling heads 22 of ordinary or any desired construction. Extending beneath the stapling heads across anvil 21 are cleats and sheet guides 23, 23 one of which may be adjustable toward and from the other in a well-known manner. Associated with each cleat guide 23 is a feeding chain 24 which is given a step-by-step movement in any suitable manner in order to cause the cleats engaged thereby to be moved step by step beneath the stapling heads across the anvil 21. In the present construction the feeding chain extends across the stapling plane so that the cleats are positively engaged thereby before they reach the stapling plane and are carried by these feed chains beyond the stapling plane. It is desirable however that some means be provided by which cleats may be readily shifted longitudinally of the chain in order to perfect a spacing thereof in case of cleats being fed in improper sequence, etc., and therefore we have provided the receiving abutment in the form of a laterally movable head 26 mounted on links 27, 27, the arrangement being such that the head may be withdrawn from coöperative relation with the chain. In order to hold the abutment end 26 in operative position we provide a lever 28 pivoted at 29 on the main frame and readily swingable into and out of holding position. We have provided two small feed rolls 32 because in practice we found in using this particular type of spur chain that the links of the chain 24 were brought into engagement with the cleats in such manner as to tend to cause the cleats to gradually creep forward on the chain and thus destroy the spaced relation between said cleat and the immediately preceding cleat. This feed roll however can be eliminated entirely by using some other spaced-cleat carrier that will not tend to change the spacing. The feed roll 32 is carried by the upper end of the vertical shaft 33 immediately preceding the receiving end of the chain 24, being placed as close as possible to that point and rotated at a speed equal to the forward speed of the chain 24 by means of a train of gears 35 connected to the shaft 36 which carries the sprocket wheel 37 over which the chain 24 passes at its receiving end. The cleats 31 are delivered to the feed roll 32 in a continuous stream by means of a constantly running chain belt 38 upon which the cleats rest and arranged between this feed belt 38 and the feed roll 32 is an interrupter finger 41 which is adapted to intermittently project into the path of movement of the cleats so as to interrupt their passage to the feed rolls 32. This interrupter finger 41 may conveniently be made of a piece of bar tool steel adjustably clamped between fingers 42 of an arm 43 secured to the upper end of a vertical shaft 44 provided at its lower end with an arm 45 the purpose of which will appear. The interrupter finger 41 is constantly urged in the direction of projection into the path of movement of the cleats by a light spring 46. Where the adjacent ends of two cleats 31 are of such character that they can closely mate when lying in the cleat guide 23 we find it advisable to form the rear end of each cleat with a notch 47. Arranged closely adjacent the receiving end of each chain 24 is a rotary spacer wheel 51 provided with a plurality of spacing fingers 52 adapted to be projected into the path of travel of the cleats, coming up into that path to the rear of each cleat immediately before an oncoming cleat is projected far enough to come within the control of the chain 24. One of these spacer wheels is provided for each cleat guide and both of the spacer wheels are rotatively secured to a shaft 53 which is continuously under a yielding driving force obtained by a suitable friction train 55 extending from the main drive shaft 56. The driving force applied to shaft 53 is of speed sufficient to cause the pins 52 to move at a speed considerably greater than the regular feed of the cleats but is comparatively light, so that any pin 52 coming into engagement with the under side of a cleat will arrest the forward rotation of the wheel.

The usual box blank to be produced by our machine will comprise four portions or sides and consequently each wheel 51 is provided with three pins 52 and a somewhat elongated flange 57 the purpose of which will appear. Carried by each wheel 51 are several cams 58, one for each pin 52 and one for the flange 57 so arranged as to engage arm 45 and withdraw interrupter 41 from the path of movement of the cleats immediately after one of the pins 52 or the rear end of flange 57 enters the path of movement of the cleats.

We find it desirable, in order to insure the prompt delivery of the cleats to the cleat feeders 32 and 24 immediately upon their release by the interrupter 41, to provide a feeder coöperating with the belt 38. For this purpose we arrange, above the cleat guides 23, a shaft 61 which is constantly driven by means of a suitable belt 62. Shaft 61 is provided adjacent each cleat guide with a gear 63. Pivoted on the shaft 61 adjacent each gear 63 is an arm 64 in the outer end of which is journaled a shaft 65 carrying a friction disk 66 and a serrated feeding wheel 67, the said feeding wheel lying immediately above the cleat guide 23 and adapted to engage the upper surface of the cleats. Journaled upon disk 66 is a gear 68 meshing with gear 63 and engaging the friction disk. Gear 68 is held against the friction disk by means of a spring 69 the tension of which may be controlled by an adjustable collar 71 mounted on the hub of disk 66. After the cleats have been spaced and are retained in that spaced relation by the chain 24, it is necessary to provide some means coöperating with the spaced cleats, for determining the location of the sheets 75. We therefore provide, adjacent each cleat guide 23, a carrier 81 which is movable longitudinally of the cleat guide from a position in front of the stapling heads 22 to a position to the rear of said heads so that this carriage is capable of crossing the stapling plane. The carriage is normally drawn to its forward position, in front of the stapling plane, by means of a weight 82, or other suitable yielding means. Mounted upon carrier 81 is a gage finger 83 laterally projectable from said carrier in any suitable manner but preferably in a line at right angles to the line of movement of the cleats. We therefore mount finger 83 upon the ends of a pair of parallel-motion links 84 which are pivoted upon the carrier 81 and normally urged in one direction by a spring 85. Finger 83 is provided with a roller or abutment 86 adapted to be engaged by a stationary cam 87 arranged at the rear end of carrier 81, the cam 87 thus serving to extract the gage finger 83 from between the cleats. Finger 83 carries an upwardly projected tongue 88 which serves as a spacing gage to determine the relationship of the sheet 75 to the cleats.

The operation is as follows: Chains 38 are constantly driven at a comparatively high rate of speed and shaft 61 is also constantly driven at such speed as to cause the feed wheels 67 to rotate at a speed corresponding with the speed of chains 38. Shaft 53 is under a constant but yielding driving force so that wheels 51 will rotate at a comparatively high rate of speed so long as that rotation is not interrupted by obstructing cleats. Shaft 53 is provided with a hand wheel 53' by means of which it may be readily turned so as to bring the rear end of flange 57 into position (for first starting of machine) where it will be engaged by an oncoming cleat just before that cleat is engaged by the wheel 32. It is to be noted that the two spacer wheels 51 are positively rotatably connected with the shaft 53 so that neither of these wheels can move without the other although one is splined on the shaft for adjustment with its cleat guide. The cleats can be fed by one boy. In this position of the spaced wheels 51 one of the cams 58 has passed arm 45 so as to withdraw the interrupter 41 and permit a cleat to be driven into engagement with the feed roller 32 and be by it driven forwardly into engagement with chain 24. In the meantime cleats arranged in proper sequences have been delivered by chains 38 and the feed wheels 67 immediately behind the oncoming cleat which is entered under control of the feed wheel 32 and chain 24. Immediately thereafter the forward cleat enters under the control of chain 24 and wheels 51 are rotated until the first finger 52 comes up into engagement with the under surface of the forward cleat whereupon further forward movement of the wheels 51 is temporarily prevented. During the forward movement of the first cleat 31 the inner end of the interrupter finger 41 rubs against the side of the cleat and when the notch 47 comes opposite the interrupter finger it drops into this notch thus projecting into the path of movement of the forward end of the next following cleat so that when that second cleat reaches the interrupter finger its further progress is prevented. Thereupon gear 68 slides on its clutch disk 66 so that the feeding movement of the disk 67 is arrested although chain 38 continues to move but, of course, has no driving effect upon the cleats except to bring up those cleats which may have been deposited on the chain by the cleat feeding operatives. As soon as the rear end of the first cleat passes the first finger 52, shaft 53 may again rotate (provided the first cleat of the other cleat guide has similarly advanced) so as to project the finger 52 up into the cleat guide behind the rear end of the first cleat. One of the cams 58 comes into engagement with arm 45 so as to retract the interrupter finger 41 from in front of the succeeding cleat and thereupon chain 38 and the feeding disks 67 very promptly coöperate to drive the interrupted cleat forwardly into engagement with a spacing pin 52 and thence into engagement with the feed roller 32 and this feed roller delivers the new cleat to a chain 24. The new cleat is thus definitely spaced with relation to the first cleat. At this time the first finger 52 has advanced with the advancing cleats and has been withdrawn from between the spaced cleats, whereupon shaft 53 serves to rapidly advance the spacer wheels 51 until the second finger 52 comes up into engagement with the under side of the second cleat where it is arrested until the rear end of the second cleat passes to a position beyond the second finger 52 whereupon this second finger is projected into the path of the cleats, the interrupter finger is again withdrawn, and the operation proceeds as described.

When the spaced cleats reach a point somewhere about the stapling plane it is necessary to provide some means to serve as a gage by means of which the controlling operative may place the sheets 75 in proper relation to the cleats and it is for this purpose that the gage fingers 83 are provided, these gage fingers being projected laterally into the space between the two cleats as soon as that place reaches a position opposite the initial position of said fingers. As soon as this projection takes place the carriage 81 will be moved along with the cleats, against the action of weight 82, and the controlling operative may place the forward edge of the sheet 75 up against the projecting tongue 88 of finger 83 shoving forwardly on the sheet so as to cause it to travel beneath the stapling heads with the cleats until an initial staple has been driven into the sheet, after which time the cleats will themselves draw the sheet forwardly with them. After the first one of the staples has been driven roller 86 comes into engagement with cam 87 and the cam serves to withdraw the gage finger 83 from beneath the cleats and sheets and as soon as this withdrawal takes place weight 82 causes carriage 81 to return to its initial position, the free end of the gage finger 83 dragging along the outside face of the cleat and continuing to drag upon that face as the cleat advances until the rear end of the cleat comes opposite the finger whereupon said gage finger is again projected between that cleat and the next succeeding cleat, which has been properly spaced therefrom by the action of the spacer wheels 51 and the operation is repeated indefinitely and automatically. The interrupter, feed roll 32, spacer 51, gear 37 and associated parts are conveniently carried by a plate 91 which may be readily removed in case of accident to permit the insertion of a similar unit without great loss of time.

We claim as our invention:

1. In a box blank machine, the combination of a cleat guide, cleat-feeding means for positively feeding simultaneously a plurality of spaced cleats along said guide, stapling mechanism arranged to operate upon such cleats while under control of the cleat-feeder, and a cleat-spacer arranged at the entrance end of the cleat-feeder, said cleat-spacer being movable into coöperative relation between a cleat under the control of the cleat-feeder and a cleat not yet under the control of the cleat-feeder, and withdrawable from between said cleats after the second cleat has passed under control of the cleat-feeder.

2. In a box blank machine, the combination of a cleat guide, cleat-feeding means for positively feeding simultaneously a plurality of spaced cleats along said guide, stapling mechanism arranged to operate upon such cleats while under control of the cleat-feeder, and a cleat-spacer arranged at the entrance end of the cleat-feeder, said cleat-spacer being automatically movable into coöperative relation between a cleat under the control of the cleat-feeder and a cleat not yet under the control of the cleat-feeder, and automatically withdrawable from between said cleats after the second cleat has passed under control of the cleat-feeder.

3. In a box blank machine, the combination of a cleat guide, cleat-feeding means for positively feeding simultaneously a plurality of spaced cleats along said guide, stapling mechanism arranged to operate upon such cleats while under control of the cleat-feeder, a cleat-spacer arranged at the entrance end of the cleat-feeder, said cleat spacer being movable into coöperative relation between a cleat under the control of the cleat-feeder and a cleat not yet under the control of the cleat-feeder, and withdrawable from between said cleats after the second cleat has passed under control of the cleat-feeder, a preliminary cleat-feeder delivering to said spacer, an interrupter arranged to intermittently interrupt the cleats in the preliminary cleat-feeder to permit placing of the cleat-spacer, and means controlled by the cleat-spacer for intermittently withdrawing the interrupter.

4. In a box blank machine, the combination of a cleat-guide, cleat-feeding means for positively feeding simultaneously a plurality of cleats along said guide, stapling mechanism arranged to operate upon such cleats while under the control of the cleat-feeder, a cleat-spacer arranged at the entrance end of the cleat-feeder, said cleat-spacer being automatically movable into coöperative relation between a cleat under the control of the cleat-feeder and a cleat not yet under the control of the cleat-feeder, and automatically withdrawable from between said cleats after the second cleat has passed under the control of the cleat-feeder, a preliminary cleat-feeder delivering to said spacer, an interrupter arranged to intermittently interrupt the cleats in the preliminary cleat-feeder to permit placing of the cleat-spacer, and means controlled by the cleat-spacer for intermittently withdrawing the interrupter.

5. In a box blank machine, the combination of a cleat guide, a cleat-feeder for positively feeding simultaneously a plurality of spaced cleats along said guide, stapling mechanism arranged to operate upon such cleats while under the control of the cleat-feeder, a cleat spacer arranged at the entrance of the cleat-feeder, said cleat-spacer movable into coöperative relation between a cleat under the control of the cleat-feeder and a cleat not yet under the control of the cleat-feeder, and withdrawable from between said cleats after said second cleat has passed under the control of the cleat-feeder, a sheet gage arranged adjacent the line of travel of the spaced cleats and projectable into the space between adjacent spaced cleats, and means for withdrawing said sheet gage and returning the same to initial position.

6. In a box blank machine, the combination of a cleat guide, a cleat-feeder for positively feeding simultaneously a plurality of spaced cleats along said guide, a rotary cleat-spacer arranged adjacent the receiving end of the cleat-feeder and provided with a plurality of cleat-spacing portions adapted to be brought into successive operative position.

7. In a box blank machine, the combination of a cleat guide, a cleat-feeder for positively feeding simultaneously a plurality of spaced cleats along said guide, a rotary cleat-spacer arranged adjacent the receiving end of the cleat-feeder and provided with a plurality of cleat-spacing portions adapted to be brought into successive operative position, and means for yieldingly urging said cleat-spacer in one direction against the cleats.

8. In a box blank machine, the combination of two cleat guides, a cleat-feeder for positively feeding simultaneously a plurality of spaced cleats along each of said guides, a rotary cleat-spacer arranged adjacent the receiving end of each cleat-feeder and provided with a plurality of cleat-spacing portions adapted to be brought into successive operative positions, positive connections between the two spacers for insuring simultaneous movement.

9. In a box blank machine, the combination of two cleat guides, a cleat-feeder for positively feeding simultaneously a plurality of spaced cleats along each of said guides, a rotary cleat-spacer arranged adjacent the receiving end of each cleat-feeder and provided with a plurality of cleat-spacing portions adapted to be brought into successive operative positions, positive connections between the two spacers for insuring simultaneous movement, and means for yieldingly rotating said spacers.

10. In a box blank machine, the combination with a cleat guide, of a spacer movable into, out of and along said guide, a cleat feeder delivering to said spacer, an interrupter arranged between the feeder and spacer and movable into and out of the cleat path, and means controlled by the spacer for intermittently withdrawing the interrupter from the cleat path.

11. The combination with a guide through which articles may pass, of a rotary spacing member having a portion projectable into, out of and along the guide, and having a portion adapted to engage each article as it travels through the guide to arrest the rotary movement of the spacing member, and means for yieldingly rotating said spacing member.

12. In a box blank machine, the combination of a cleat guide, cleat-feeding means for positively feeding simultaneously a plurality of spaced cleats along said guide, and a cleat spacer arranged at the entrance end of the cleat feeder, said cleat spacer being movable into coöperative relation between a cleat under the control of the cleat feeder and a cleat not yet under the control of the cleat feeder and withdrawable from between said cleats after the second cleat has passed under the control of the cleat feeder.

13. In a box blank machine, the combination of a cleat guide, cleat-feeding means for positively feeding simultaneously a plurality of spaced cleats along said guide, and a cleat spacer arranged at the entrance end of the cleat feeder, said cleat spacer being automatically moved into coöperative relation between a cleat under the control of the cleat feeder and a cleat not yet under the control of the cleat feeder, and automatically withdrawable from between said cleats after the second cleat has passed under the control of the cleat feeder.

14. In a box blank machine, the combination of stapling mechanism, cleat guides extending transversely through the stapling plane, and a rotary cleat spacer arranged adjacent each cleat guide in front of the stapling plane, said cleat spacer having a portion projectable, by rotation of the cleat spacer, into the cleat guide.

15. In a box blank machine, the combination of stapling mechanism, cleat guides extending transversely through the stapling plane, a rotary cleat spacer arranged adjacent each cleat guide in front of the stapling plane, each cleat spacer having a portion projectable, by rotation of the cleat spacer, into the cleat guide, means for driving the cleats through their guides, and means for rotating the cleat spacer.

16. In a box blank machine, the combination of stapling mechanism, cleat guides extending transversely through the stapling plane, a rotary cleat spacer arranged adjacent each cleat guide and provided with a plurality of spacing members projectable successively into the adjacent cleat guide, one of said spacing members having a greater extent than the adjacent spacing member, and each of said spacing members formed to lie against a passing cleat and be restrained thereby, yielding means for intermittently rotating the cleat spacer, and means for driving the cleats through the cleat guides.

17. In a box blank machine, the combination of stapling mechanism, cleat guides extending transversely through the stapling plane, a rotary cleat spacer arranged adjacent each cleat guide and provided with a plurality of spacing members projectable successively into the adjacent cleat guide, one of said spacing members having a greater extent than the adjacent spacing member and each of said spacing members formed to lie against a passing cleat and be restrained thereby, and yielding means for intermittently rotating the cleat spacer.

18. In a box blank machine, the combination of stapling mechanism, cleat guides extending transversely through the stapling plane, a rotary cleat spacer arranged adjacent each cleat guide and provided with a plurality of spacing members projectable successively into the adjacent cleat guide, one of said spacing members having a greater extent than the adjacent spacing member, and means for driving the cleats through the cleat guides.

19. In a box blank machine, the combination of stapling mechanism, cleat guides extending transversely through the stapling plane and a rotary cleat spacer arranged adjacent each cleat guide and provided with a plurality of spacing members projectable successively into the adjacent cleat guide, one of said spacing members having a greater extent than the adjacent spacing member.

20. In a box blank machine, the combination of a cleat guide, a cleat spacing member arranged adjacent the cleat guide and provided with a plurality of cleat spacing portions arranged for successive projection into and withdrawal from the cleat guide, means for yieldingly urging said member in one direction to project its cleat spacing portions successively into the cleat guide, whereby projecting movement of the cleat spacing member will be controlled by the passage of cleats through the cleat guide, and means other than the cleat spacing member for driving the cleats through the cleat guide.

21. In a box blank machine, the combination of a cleat guide, a cleat spacing member arranged adjacent the cleat guide and provided with a plurality of cleat spacing portions arranged for successive projection into and withdrawal from the cleat guide, and means for yieldingly urging said member in one direction to project its cleat spacing portions successively into the cleat guide, whereby projecting movement of the cleat spacing member will be controlled by the passage of cleats through the cleat guide.

In witness whereof, we have hereunto set our hands and seals at Crawfordsville, Indiana, this 14" day of June, A. D. one thousand nine hundred and ten.

JOHN HAYS BIRCH. [L. S.]
JOHN HENRY BIRCH. [L. S.]

Witnesses:
H. H. RISTINE,
E. E. AMES.